United States Patent [19]

Wessling et al.

[11] Patent Number: 5,476,612
[45] Date of Patent: Dec. 19, 1995

[54] PROCESS FOR MAKING ANTISTATIC OR ELECTRICALLY CONDUCTIVE POLYMER COMPOSITIONS

[75] Inventors: Bernhard Wessling, Bargteheide; Holger Merkle, Ahrensburg; Susanne Blättner, Hamburg, all of Germany

[73] Assignee: Zipperling Kessler & Co., (GmbH & Co.)., Ahrensburg, Germany

[21] Appl. No.: 973,523

[22] Filed: Nov. 9, 1992

Related U.S. Application Data

[63] Continuation of Ser. No. 752,497, filed as PCT/EP90/02311, Dec. 22, 1990, abandoned.

[30] Foreign Application Priority Data

Dec. 30, 1989 [DE] Germany .......................... 39 43 420.6

[51] Int. Cl.$^6$ ..................................................... H01B 1/06
[52] U.S. Cl. ........................... 252/511; 252/502; 252/506; 252/507; 524/495; 524/496; 524/912
[58] Field of Search ..................................... 252/502, 506, 252/507, 511; 524/495, 496, 912

[56] References Cited

U.S. PATENT DOCUMENTS

| | | | |
|---|---|---|---|
| 4,806,212 | 2/1989 | Wessling et al. | 204/130 |
| 4,929,388 | 5/1990 | Wessling | 524/439 |
| 5,093,035 | 3/1992 | Dziurla et al. | 524/495 |

FOREIGN PATENT DOCUMENTS

| | | |
|---|---|---|
| 109824 | 5/1984 | European Pat. Off. . |
| 0181587 | 11/1985 | European Pat. Off. . |
| 3329264 | 2/1985 | Germany . |
| 3610388 | 3/1986 | Germany . |
| 3824516 | 1/1990 | Germany . |
| 1069662 | 3/1989 | Japan . |

OTHER PUBLICATIONS

Patent Abstracts of Japan, Band 13, Nr. 275, Jun. 23, 1989.

*Primary Examiner*—Paul R. Michl
*Assistant Examiner*—J. K. Rajavru
*Attorney, Agent, or Firm*—Cushman, Darby & Cushman

[57] ABSTRACT

Polymeric compositions rendered antistatic or electrically conductive showing increased conductivity are obtained by incorporating into a matrix polymer a combination of A. a first finely divided conductive material, namely conductive carbon black with a BET surface area of more than 80 $m^2/g$ or an intrinsically conductive organic polymer in complexed form, and B. a second finely divided conductive material, namely graphite or an intrinsically conductive polymer in complexed form, which is different from the material used as material A, or a metal powder and/or C. a finely divided non conductive material having an average particle size below 50 microns.

8 Claims, No Drawings

PROCESS FOR MAKING ANTISTATIC OR ELECTRICALLY CONDUCTIVE POLYMER COMPOSITIONS

This is a continuation of application Ser. No. 07/752,497, filed as PCT/EP90/02311, Dec. 22, 1990, now abandoned.

The plastics processing industry requires for various purposes (e.g. for elimination of electrostatic charges, for electromagnetic shielding or as electrodes) antistatic or electrically conductive modifications of conventional polymers.

Thermoplastic polymers are being used amongst others as polymers but also duropastic polymers and enamels are being made conductive. Carbon black color pigment and so-called "conductive carbon black" (carbon black with a specific surface area of >80 m$^2$/g), carbon fibers, metal coated glass microspheres, metal fibers and metal flakes are used for this purpose; mixtures of conventional polymers with intrinsically conductive polymers are also already known (EP-OS 168 620). Such mixtures are frequently also referred to as "compounds" or "polymer blends".

The present invention relates to a method of optimizing antistatic or electrically conductive polymers in which finely divided conductive materials, i.e. materials with a particle size of about 1 micron and below are used. Conductive carbon black and dispersable intrinsically conductive polymers, e.g. those described in EP-OS 329 768, have the advantage that the conductivity is drastically increased already at a content of less than 20 vol. %, sometimes even at significantly below 10 vol. %. This behavior is normally referred to as "percolation" and is described using the percolation theory; more recently an interpretation of this phenomenon as "flocculation process" has been advanced (compare B. Weβling, Mol. Cryst. Liqu. Cryst. 160, 205 (1988) and Synt. Met. 27, A83 (1988).

The optimization of polymers which have been made conductive is almost always concerned with lowering the cost and with improving the mechanical and the processing properties while retaining the conductivity by lowering the amount of conductive additives and also by a parallel shift of the percolation curve (the plot of the conductivity vs. the percent content of conductive materials) to lower contents. For achieving this objective different proposals have been made in the literature:

According to the "percolation theory" it is recommended to disperse in the polymers highly structured conductive materials (compare E. Sichel (ed.) "Carbon Black Polymer Composites", New York, 1982); apparently this is only successful when using larger particles (e.g. fibers).

The concentration of the conductive materials in so-called "conductive paths" (GB-OS 2 214 511 and EP-OS 181 587) has proved successful in many cases.

The improvement of the dispersibility of the conductive materials (EP-OS 329 768) allows to shift the necessary critical concentration for the increase of the conductivity to lower percentages.

All proposals are still having disadvantages, especially that the advantage of lower material cost is frequently counter-balanced by increased production expenditures, or that the possible areas of application are restricted. Two examples may illustrate this point:

The "conductive paths" concept (EP-OS 181 587) is not applicable if—for whatever reasons—pure monophasic polymers are to be rendered conductive.

Polymer blends with intrinsically conductive polymers exhibited frequently the disadvantage of unsatisfactory mechanical properties if modifications are needed which are stiff and/or dimensionally stable upon heating.

It is therefore an object of the invention to develop a method which affords a further possibility of optimizing polymers which are antistatic or conductive, as an alternative and/or improvement over the "conductive paths" or "dispersion" concepts.

The invention is directed to a method for preparing polymeric compositions rendered antistatic or electrically conductive and showing increased conductivity from at least one non-conductive matrix polymer and at least two additives, which is characterized in that there is used as additives a combination of A. a first finely divided conductive material, namely conductive carbon black having a BET surface area of more than 80 m$^2$/g or an intrinsically conductive organic polymer in complexed form, and B. a second finely divided conductive material, namely graphite or an intrinsically conductive polymer in complexed form, which is different from the material used as material A, or a metal powder and/or C. a finely divided non-conductive material having an average particle size below 50 microns.

Surprisingly it has been found that at a given additive content in the polymer matrix the conductivity of the compound is significantly increased if a finely divided (preferred average particle size≦1 micron) conductive material A is combined with another conductive material B consisting preferably of larger particles of >0,5 microns, e.g. about 10 microns (1 to 50 microns), and/or a non-conductive material C having an average particle size<10 microns.

Surprisingly a conductivity synergism occurs, i.e. at identical weight or volume proportion of the finely divided conductive material A alone or the coarser material B alone a lower conductivity results as when incorporating A and B together in the same weight or volume ratio. Accordingly one achieves a higher conductivity by combining A and B in comparison to A or B alone at the identical degree of filling.

Equally surprising is the effect that at a given content of material A the conductivity increases by addition of material C although material C is non-conductive. This effect is in some cases so significant that at a concentration of material A below the critical threshold of the sudden conductivity increase (below the percolation point) practically no conductivity is measurable whereas the sudden conductivity increase occurs when the non-conductive material C is added. When using the materials B and C in combination with material A the mentioned effects are additive.

In both cases an improvement of the mechanical properties will surprisingly often result. This is detectable primarily in concentration ranges resulting in a particularly high conductivity, and when using intrinsically conductive polymers as material A in combination with a suitable material C in rigid or heat stable polymers.

As material A carbon black (conductive carbon black) having a specific surface area of more than 80 m$^2$ g or powdery, preferably dispersible intrinsically conductive polymers in complexed form can be used which display in the polymer matrix a particle size of ≦1 micron, preferably <500 nanometer. Suitable intrinsically conductive polymers are e.g. polyacetylene, polypyrrole, polyphenylenes, polythiophenes, polyphthalocyanines and other polymers with conjugated π-electron systems which can be rendered conductive (complexed) in a known manner with acids or by oxidation. Particularly preferred are complexed polyanilines.

Graphites are suitable as material B. Particularly preferred is intercalated graphite (compare Römpp, Chemie-Lexikon, 8th ed., p. 1540/41 (1981), e.g. graphite loaded with copper(III)-chloride or with nickel(III)-chloride. Further electrode graphite or natural graphite may be used. Metal powders are also useful as material B. The particle size of material B is in each case preferably larger than that of material A.

As material C essentially all pigments, fillers and other non-conductive particulate materials which are non-fusible under processing conditions or materials which are insoluble in the polymer matrix and having an average particle size of about 50 microns or less may be used. Preferably the particle size of material C is in each case larger than that of material A. Limitations concerning the chemical composition of the particles have up to now not been found. Thus titanium dioxide, organic or inorganic pigments, fillers such as silica, chalk, talcum and others, but also the neutral (compensated) non-conductive forms of intrisically conductive polymers may be employed.

As matrix polymers all polymers are suitable such as thermoplastic or duromeric polymers or enamels. The invention may also be used in polymer blends, particularly successfully in those corresponding to the teaching of EP-OS 168 620.

The volume ratio between the materials A and B or between A and C or between A and a combination of B and C may be varied within broad ranges between about 20:1 and 1:20 and has to be optimized in each case. Preferred are the following values for

| | |
|---|---|
| the combination of A with B | 2:1 to 1:5 |
| the combination of A with C | 2:1 to 10:1. |

The examples show a representative selection of successful experiments and corresponding comparison experiments. The incorporation of the materials A and B and/or C may be effected by conventional methods which are known per se; it is preferred to premix the materials A and B and/or C prior to their incorporation into the matrix polymer.

An explanation for the surprising effects achieved with the invention is not yet possible. They are completely incomprehensible in the light of the "percolation theory", or even inadmissible. In connection with the newer concepts (B. Wessling, loc. cit.) of the sudden conductivity increase as a phase transition between the dispersed and flocculated state the effects are also not comprehensible but at least admissible if further, up to now unproven assumptions are included.

In the following examples the mentioned materials A, B and C were incorporated into conventional polymer systems. PE is LUPOLEN® 2424H (BASF AG). PETG is a copolyester manufactures by Eastman Kodak. The enamel (examples 27 and 32) is a PVC/VA-copolymer enamel comprising solvent.

The incorporation of the additives into PE and PETG was accomplished in an internal mixer after pre-mixing of the materials A, B and optionally C in a laboratory mixer. The mixtures were hot pressed; the specific conductivity was determined on the pressed samples using the four point measuring technique.

The incorporation of the additives into the enamel system was achieved after premixing in a ball mill. The liquid enamel was applied to a support and dried.

All percentages are percent by weight.
In the table the following were used:

Ketjenblack EC=conductive carbon black, surface area about 800 m²/g.

Graphite EP 1010=electrode graphite, particle size about 10 microns.

Polyaniline-pTs=polyaniline complexed with p-toluene sulfonic acid.

| Ex. Nr. | Matrix Polymer | Material A | % | Material B | % | Material C | % | Total % | Conductivity (S/cm) |
|---|---|---|---|---|---|---|---|---|---|
| 1 | PE | Ketjenblack EC | 10 | Graphite EP 1010 | 35 | — | — | 45 | 3–5 |
| 2 | PE | Ketjenblack EC | 22 | — | — | — | — | 22* | $10^{-1}$ |
| 3 | PE | — | — | Graphite EP 1010 | 45 | — | — | 45 | $10^{-2}$ |
| 4 | PE | — | — | Graphite EP 1010 | 62 | — | — | 62* | $10^{-1}$ |
| 5 | PE | Ketjenblack EC | 3 | — | — | — | — | 3 | $10^{-10}$ |
| 6 | PE | Ketjenblack EC | 4 | — | — | — | — | 4 | $10^{-10}$ |
| 7 | PE | Ketjenblack EC | 4 | — | — | Titanium dioxide | 1 | 5 | $10^{-3}$ |
| 8 | PE | Ketjenblack EC | 4 | — | — | Titanium dioxide | 3 | 7 | $5 \cdot 10^{-1}$ |
| 9 | PE | Ketjenblack EC | 5 | — | — | — | — | 5 | $5 \cdot 10^{-5}$ |
| 10 | PE | Ketjenblack EC | 5 | — | — | Titanium dioxide | 1 | 6 | $10^{-2}$ |
| 11 | PE | Ketjenblack EC | 5 | — | — | Titanium dioxide | 3 | 8 | $2 \cdot 10^{-3}$ |
| 12 | PE | Ketjenblack EC | 5 | — | — | Yellow 13 | 1 | 6 | $10^{-4}$ |
| 13 | PE | Ketjenblack EC | 5 | — | — | Yellow 13 | 3 | 8 | $5 \cdot 10^{-4}$ |
| 14 | PE | Ketjenblack EC | 12, 5 | CuCl$_3$ graphite | 37, 5 | — | — | 50 | 23 |
| 15 | PE | — | — | CuCl$_3$ graphite | 50 | — | — | 50 | $10^{-2}$ |
| 16 | PE | Ketjenblack EC | 12, 5 | NiCl$_3$ graphite | 37, 5 | — | — | 50 | 10 |
| 17 | PE | — | — | NiCl$_3$ graphite | 50 | — | — | 50 | $10^{-2}$ |
| 18 | PE | Polyaniline-pTs | 30 | CuCl$_3$ graphite | 30 | — | — | 60 | 4 |
| 19 | PE | — | — | CuCl$_3$ graphite | 60 | — | — | 60 | $5 \cdot 10^{-1}$ |
| 20 | PE | Polyaniline-pTs | 12, 5 | Polyaniline-pTs | 37, 5 | — | — | 50 | 4 |
| 21 | PE | — | — | Polyaniline-pTs | 50 | — | — | 50 | $10^{-2}$ |
| 22 | PETG | Polyaniline-pTs | 40 | — | — | — | — | 40 | $5 \cdot 10^{-2}$ |
| 23 | PETG | Polyaniline-pTs | 40 | — | — | Yellow 13 | 8 | 48 | 2 |
| 24 | PETG | Polyaniline-pTs | 30 | — | — | Yellow 13 | 6 | 36 | $4 \cdot 10^{-1}$ |
| 25 | PETG | Polyaniline-pTs | 20 | — | — | Yellow 13 | 4 | 24 | $2 \cdot 10^{-2}$ |
| 26 | PETG | Polyaniline-pTs | 30 | — | — | — | — | 30 | $5 \cdot 10^{-4}$ |
| 27 | PVC-VA enamel | Polyaniline-pTs | 35 | — | — | — | — | 35 | $5 \cdot 10^{-1}$ |
| 28 | PVC-VA enamel | — | — | CuCl$_3$ graphite | 35 | — | — | 35 | $10^{-1}$ |
| 29 | PVC-VA | Polyaniline-pTs | 30 | CuCl$_3$ graphite | 5 | — | — | 35 | 10 |

-continued

| Ex. Nr. | Matrix Polymer | Material A | % | Material B | % | Material C | % | Total % | Conductivity (S/cm) |
|---|---|---|---|---|---|---|---|---|---|
| 30 | PVC-VA enamel | Polyaniline-pTs | 30 | — | | Yellow 13 | 5 | 35 | 2 |
| 31 | PVC-VA enamel | Polyaniline-pTs | 6 | — | | — | | 6 | $10^{-3}$ |
| 32 | PVC-VA enamel | Polyaniline-pTs | 6 | — | | Iron oxide Bayferrox 318M | 1 | 7 | $10^{-2}$ |

*max. possible degree of filling

We claim:

1. A method for preparing antistatic or electrically conductive polymer compositions having increased conductivity which comprises the step of mixing at least one non-conductive matrix polymer and two additives A and C, wherein the additives A and C are respectively selected from the group consisting of:
   A. at least one finely divided conductive material selected from the group consisting of conductive carbon black with a BET surface area of more than 80 $m^2/g$ and an intrinsically conductive organic polymer in complexed form, and
   C. a finely divided non-conductive material having an average particle size below 50 microns which is nonfusible under the processing conditions and insoluble in the matrix polymer.

2. The method according to claim 1, wherein complexed polyaniline is used as the intrinsically conductive polymer of additive A.

3. The method according to claim 1, wherein additive C is at least one selected from the group consisting of inorganic or organic electrically non-conductive filler and inorganic or organic electrically non-conductive pigment.

4. The method according to claim 3, wherein said additive C is an inorganic pigment wherein said inorganic pigment is titanium dioxide.

5. The method according to claim 3, wherein said additive C is yellow 13.

6. A method for preparing antistatic or electrically conductive polymer compositions having increased conductivity which comprises the step of mixing at least one non-conductive matrix polymer and two additives A and C, wherein the additives A and C are respectively selected from the group consisting of:
   A. at least one finely divided conductive material selected from the group consisting of conductive carbon black with a BET surface area of more than 80 $m^2/g$ and an intrinsically conductive organic polymer in complexed form, and
   C. at least one finely divided non-conductive material having an average particle size below 50 microns which is nonfusible under the processing conditions and insoluble in the matrix polymer,
   wherein the volume ratio between additives A and C is from about 20:1 to about 1:20.

7. A method for preparing antistatic or electrically conductive polymer compositions having increased conductivity which comprises the step of mixing at least one non-conductive matrix polymer and two additives A and C, wherein the additives A and C are respectively selected from the group consisting of:
   A. at least one finely divided conductive material selected from the group comprising conductive carbon black with a BET surface area of more than 80 $m^2/g$ and an intrinsically conductive organic polymer in complexed form, and
   C. at least one finely divided non-conductive material having an average particle size below 50 microns which is nonfusible under the processing conditions and insoluble in the matrix polymer,
   wherein the volume ratio between additives A and C is from about 2:1 to about 10:1.

8. The method according to claim 1, wherein additives A and C are mixed prior to their addition to the matrix polymer.

* * * * *